(12) United States Patent
Abiri et al.

(10) Patent No.: US 9,651,803 B2
(45) Date of Patent: May 16, 2017

(54) BANDWIDTH ENHANCEMENT TECHNIQUE USING INDUCTIVE PEAKING

(71) Applicant: California Institute of Technology

(72) Inventors: Behrooz Abiri, Pasadena, CA (US); Saman Saeedi, Pasadena, CA (US); Seyed Ali Hajimiri, La Canada, CA (US); Azita Emami, Pasadena, CA (US)

(73) Assignee: CALIFORNIA INSTITUTE OF TECHNOLOGY, Pasadena, CA (US)

( * ) Notice: Subject to any disclaimer, the term of this patent is extended or adjusted under 35 U.S.C. 154(b) by 0 days.

(21) Appl. No.: 15/073,240

(22) Filed: Mar. 17, 2016

(65) Prior Publication Data

US 2017/0023809 A1    Jan. 26, 2017

Related U.S. Application Data

(60) Provisional application No. 62/134,434, filed on Mar. 17, 2015.

(51) Int. Cl.
*G02F 1/025*   (2006.01)
*G02F 1/01*    (2006.01)

(52) U.S. Cl.
CPC ............ *G02F 1/025* (2013.01); *G02F 1/0121* (2013.01); *G02F 2203/15* (2013.01)

(58) Field of Classification Search
CPC ........ G02F 1/0121; G02F 1/015; G02F 1/025; G02B 6/12; G02B 6/14; G02B 6/26
See application file for complete search history.

(56) References Cited

U.S. PATENT DOCUMENTS

| | | | | |
|---|---|---|---|---|
| 7,116,853 B2* | 10/2006 | Gunn, III | ............... | G02F 1/025 257/499 |
| 7,447,387 B2* | 11/2008 | Shih | ..................... | G02F 1/015 385/2 |
| 7,747,122 B2* | 6/2010 | Shetrit | ............... | G02B 6/12004 359/279 |
| 7,751,654 B2* | 7/2010 | Lipson | .................... | G02F 1/025 385/1 |
| 8,295,655 B2* | 10/2012 | Manipatruni | ...... | G02B 6/12007 385/2 |

(Continued)

FOREIGN PATENT DOCUMENTS

JP    2012-198465 A    10/2012

OTHER PUBLICATIONS

PCT International Search Report and Written Opinion of the International Search Authority for application PCT/US2016/022925 mailed Jul. 14, 2016.

*Primary Examiner* — Daniel Petkovsek
(74) *Attorney, Agent, or Firm* — Alston & Bird LLP (57) ABSTRACT

An integrated optical modulator includes, in part, a pair of waveguides and an inductor. The first waveguide is adapted to receive an incoming optical signal. The second waveguide includes a portion placed in proximity of the first waveguide so as to enable the incoming optical signal travelling in the first waveguide to couple to the second waveguide. The second waveguide comprises a p-n junction. The inductor has a first terminal coupled to the p-n junction and a second terminal coupled to a contact pad. The second waveguide has a circular shape. The inductor optionally has a spiral shape.

6 Claims, 6 Drawing Sheets

(56) References Cited

U.S. PATENT DOCUMENTS

| | | | |
|---|---|---|---|
| 8,571,363 B2* | 10/2013 | Wu | G02B 6/12007 385/32 |
| 2006/0008223 A1 | 1/2006 | Gunn et al. | |
| 2007/0280309 A1* | 12/2007 | Liu | G02F 1/025 372/26 |
| 2007/0292073 A1 | 12/2007 | Li | |
| 2012/0062974 A1 | 3/2012 | Manipatruni et al. | |
| 2013/0011139 A1 | 1/2013 | Hardy et al. | |

* cited by examiner

BANDWIDTH ENHANCEMENT TECHNIQUE USING INDUCTIVE PEAKING

CROSS REFERENCE TO RELATED APPLICATIONS

The present application claims benefit under 35 USC 119 (e) of U.S. provisional Application No. 62/134,434, filed Mar. 17, 2015, entitled "Bandwidth Enhancement Technique Using Inductive Peaking", the content of which is incorporated herein by reference in its entirety.

FIELD OF THE INVENTION

The present invention relates to optoelectronic devices, and more particularly to optical ring modulators.

BACKGROUND OF THE INVENTION

Electro-optic modulators (EOM) are commonly used in optical communication networks. A phase-modulating EOM may be used in a Mach-Zehnder interferometer to modulate the amplitude of an incoming optical signal. As is known, Mach-Zehnder based opto-electronic modulators have a relatively high power consumption, are large and require a high drive voltage.

Improving the bandwidth-density product in an integrated silicon photonic system requires a corresponding improvement in the performance of the optical modulator disposed in such a system. Optical modulation in conventional optical ring modulators is achieved either by varying the coupling level or by changing the index of refraction of the ring, either by injecting excess minority carriers in the associated PIN junction or by changing the reverse bias voltage applied to the PN junction. The change in the index of refraction causes a change in the optical path length of the ring, in turn changing the resonance frequency of the ring.

As is well known, conventional optical ring modulators are susceptible to temperature fluctuations. Furthermore, as the Quality factor (Q) of a conventional optical ring modulator increases to achieve lower power consumption and enhanced energy efficiency, the bandwidth of the optical ring modulator decreases. In other words, there is a trade-off between the optical bandwidth and power consumption of a conventional optical ring modulator.

Figure 1A:
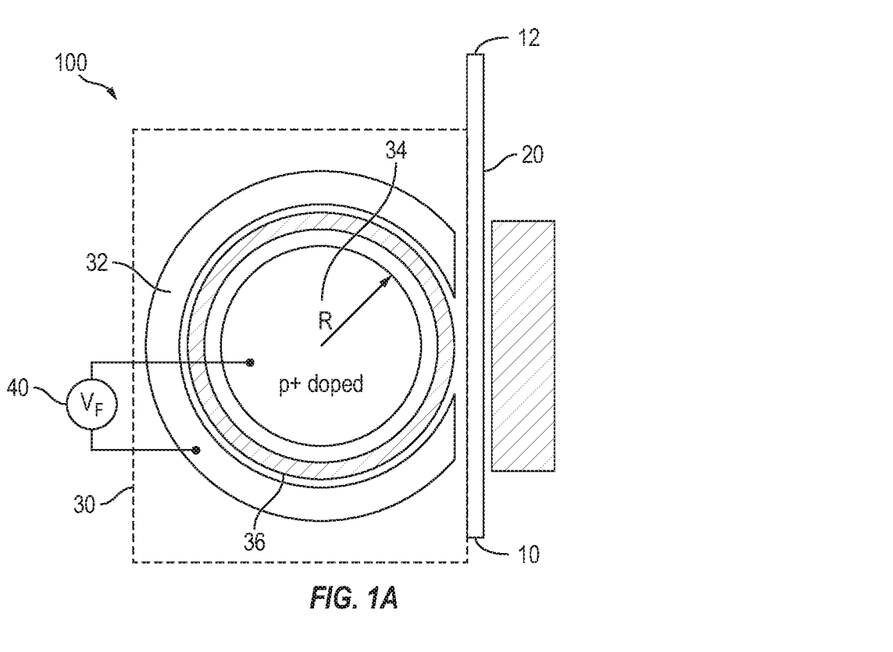
FIG. 1A is a top schematic view of an optical ring modulator as known in the prior art.

FIG. 1A is a top schematic view of an optical ring modulator 100, as known in the prior art. Optical ring modulator 100 is shown as including, in part, a waveguide 20, and an optical ring 30. The optical signal entering waveguide 20 through its input port 10 is coupled to optical ring 30.

Figure 1B:
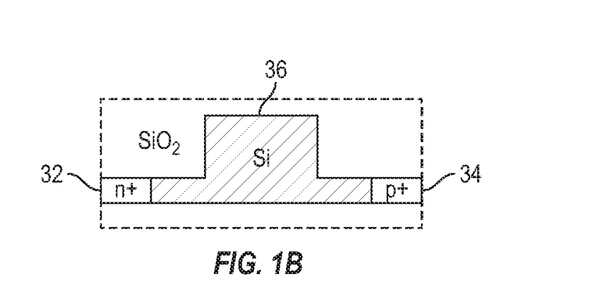
FIG. 1B is a cross-section view of the optical ring modulator of FIG. 1A.
Figure 1C:
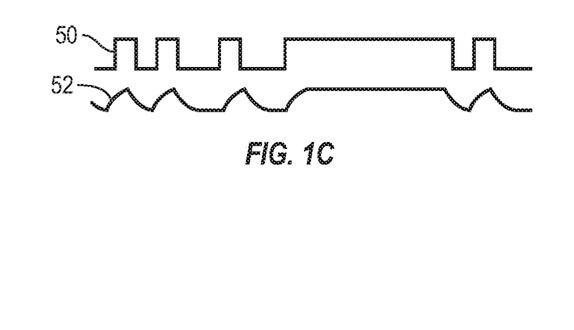
FIG. 1C shows an example of the input/output optical signals of the optical ring modulator of FIG. 1A.

Optical ring 30 includes an intrinsic silicon region 36, a highly doped n+ region 32 encompassing silicon region 36, and a highly doped p+ region 34 formed within the inner area of silicon region 36. FIG. 1B is a cross-section view of optical ring 30 showing intrinsic silicon region 36, and the highly doped n+ and p+ regions 32 and 34, respectively. By changing the voltage applied between n+ region 32 and p+ region 34, the refractive index of the optical ring 30 is varied. The interference between the optical signals travelling through waveguide 20 and optical ring 30 modulates the optical signal at the output port 12 of optical ring modulator 100. Referring to FIG. 1C, signals 50 (delivered via input port 10) and 52 (delivered via output port 20) are exemplary input and output signals of the optical modulator shown in FIG. 1A.

The time-domain dynamic transmission of the ring modulator, T(t) may be defined as:

$$T(t) = \sigma(t) + \frac{k(t)}{k(t-\tau)} \alpha(t)\exp[-i\varphi(t)](\sigma(t-\tau)T(t-\tau)-1] \quad (1)$$

where σ and k respectively represent transmission and coupling coefficients of the optical ring modulator, α represents the attenuation level, φ represents the phase shift inside the ring, and τ represents the travel time of the optical signal around the resonator, i.e., the round trip time in the resonator.

Figure 2A:
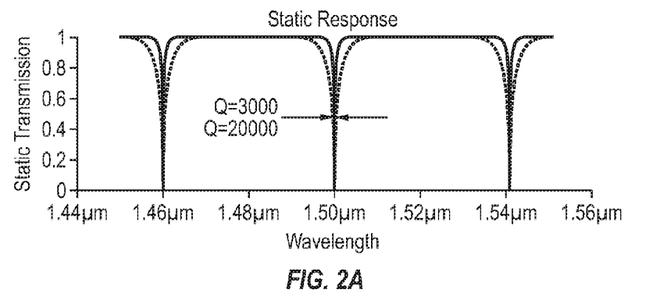
FIG. 2A shows an example of the static transmission characteristic of a conventional optical ring modulator.
Figure 2B:
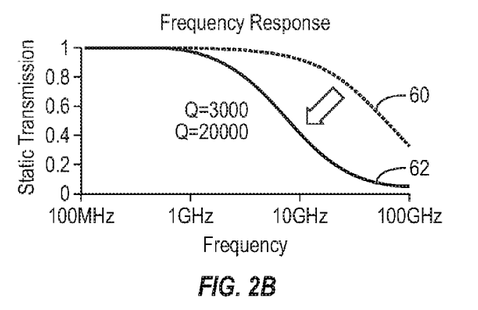
FIG. 2B shows the frequency responses as a functions of the Q of a conventional optical ring modulator.
Figure 2C:
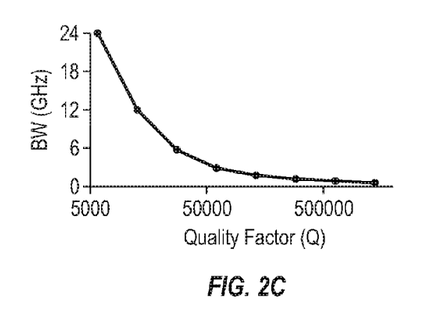
FIG. 2C shows the drop-off in the frequency response as a function of the Q of a conventional optical ring modulator.

FIG. 2A shows the static transmission characteristic of a conventional optical ring modulator obtained through numerical solution of expression (1) using an iterative approach. FIG. 2B shows the Q-bandwidth response of such an optical ring modulator. Plots 60 and 62 of FIG. 2B respectively correspond to conventional optical modulators having Qs 3000 and 20000 respectively. It is seen that the modulator with a Q of 3000 has a wider bandwidth. FIG. 2C also shows the drop-off in the frequency response as the Q of the modulator increases. Since the Q of a modulator is inversely proportional to the attenuation along the modulator, the overall bandwidth of a modulator with a high Q is limited for high Q rings. For example, computer simulation of an optical ring modulator with radius of 16μm and Q of 1500 shows that the optical bandwidth is limited to about 40 GHz.

Figure 2D:
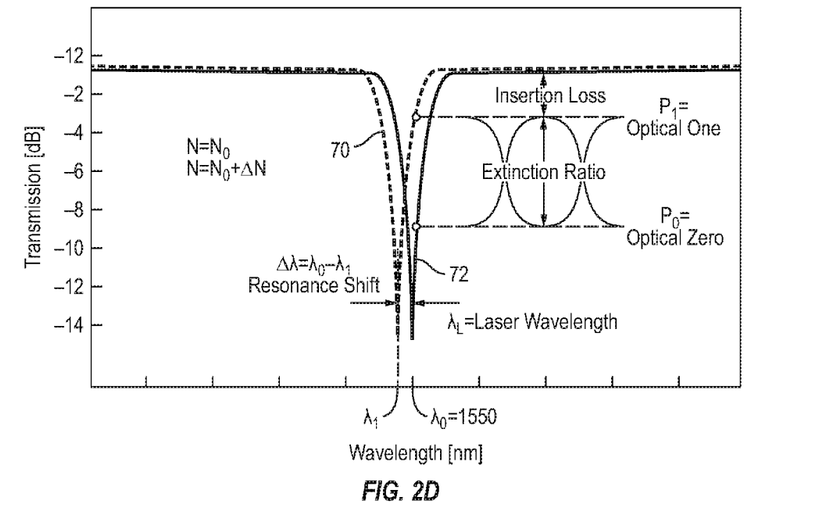
FIG. 2D shows an example of the static transmission characteristic of a conventional optical ring modulator.

FIG. 2D shows the static transmission characteristic of another exemplary optical ring modulator that receives an optical signal generated using a laser having a wavelength of nearly 1527.4 nm, as shown. Plots 70 and 72 respectively show the static transmission characteristic of the optical ring modulator for two different reverse-biased voltages. By changing the reverse-biased voltage of the P-N junction disposed in the ring, the index of refraction of the ring and hence the optical length of the ring changes, thereby resulting in a shift in the resonance frequency of the ring. In plot 70, the resonance frequency is shown to occur at wavelength of nearly 1527.2 nm associated with a reverse bias voltage of $V_1$. In plot 72, the resonance frequency is shown to occur at wavelength of nearly 1527.3 nm associated with a reverse bias voltage of V2. The modulator's transmission value is seen to change from −9 dB (associated with an optical output of zero) to −3dB (associated with an optical value of one) defining an extinction ratio of 6 dB. In other words, a change of $\pm(V_2-V_1)$ in the voltage applied to the reverse-biased p-n junction disposed in the modulator causes the optical output signal of the modulator to switch between one and zero. A need continues to exist for an improved optical modulator.

BRIEF SUMMARY OF THE INVENTION

An integrated optical modulator, in accordance with one embodiment of the present invention includes, in part, a first waveguide adapted to receive an incoming optical signal, a second waveguide having a portion placed in proximity of the first waveguide so as to enable the optical signal travelling in the first waveguide to couple to the second waveguide, and an inductor. The second waveguide includes a p-n junction coupled to a first terminal of the inductor whose second terminal is coupled to a contact pad.

In one embodiment, the inductor is a spiral inductor. In one embodiment, second waveguide has a circular shape.

A method of modulating an optical signal, in accordance with one embodiment of the present invention, includes, in part, delivering the optical signal to a first waveguide that includes a p-n junction, causing the optical signal traveling through the first waveguide to be coupled to a second waveguide placed in proximity of the first waveguide, and storing the signal energy in an inductor disposed between the p-n junction and a contact pad. In one embodiment, the inductor has a spiral shape. In one embodiment, the second waveguide has a circular shape.

DETAILED DESCRIPTION OF THE INVENTION

Figure 3A:
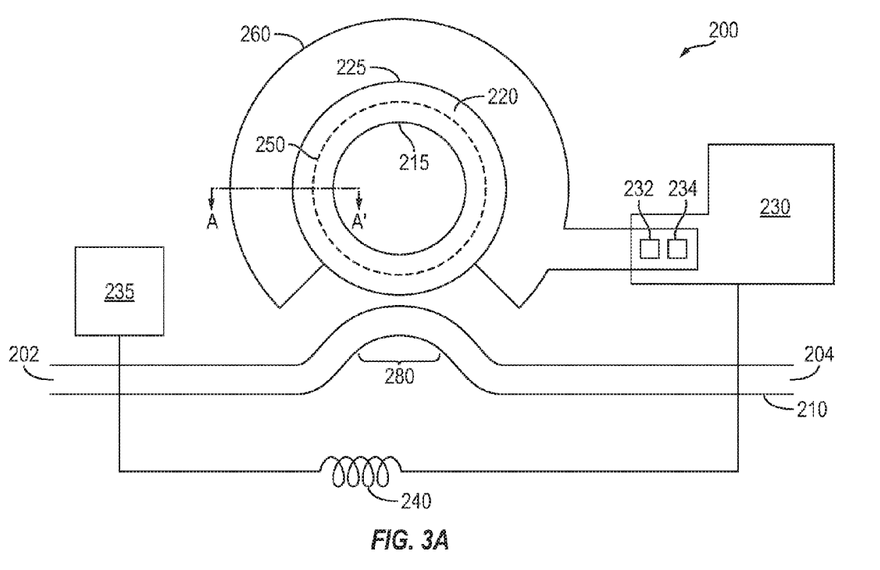
FIG. 3A is a combined layout/schematic view of an optical ring modulator 200, in accordance with one embodiment of the present invention.

FIG. 3A is a combined layout/schematic view of an optical ring modulator 200, in accordance with one embodiment of the present invention. Optical ring modulator 200 (hereinafter alternatively referred to as modulator) 200 is shown as including, in part, a main waveguide 210, a waveguide ring 220 formed between circular lines 215 and 225, and an inductor 240 disposed between contact pads 230 and 235.

The optical signal entering input port 202 is coupled to waveguide 220 as it passes through section 280 of waveguide 210 where the two waveguides are formed in close proximity of one another. The modulated optical signal is supplied at output port 204 of the modulator.

Figure 3B:
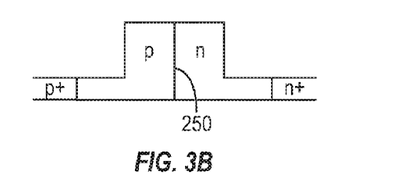
FIG. 3B is a cross-sectional view of the waveguide ring of FIG. 3A, in accordance with one embodiment of the present invention.

In the exemplary embodiment of the modulator shown in FIG. 3A, the area within the dashed circular line 250 is negatively doped to form n+ and n-type semiconductor regions. In FIG. 3A, for simplicity and clarity, the n+ and n regions are collectively shown as one region within the inner boundary of circular line 25. The area between lines 250 and 260 is positively doped to form p+ and p-type semiconductor regions. For simplicity and clarity, the p+ and p regions are collectively shown as one region between circular line 250 and outer perimeter line 260. FIG. 3B is a cross-sectional view of waveguide ring 220 along the AA' line showing the p-n junction along boundary 250 as well as p+, p, n+ and n regions.

Figure 4:
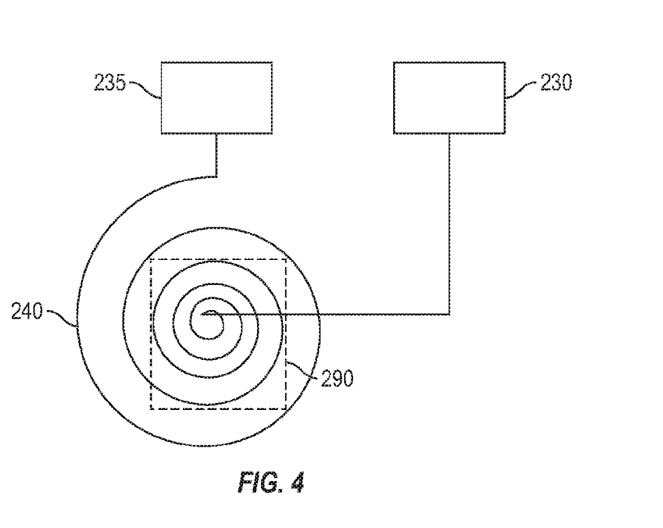
FIG. 4 is an exemplary top layout view of the inductor used in an optical ring modulator, in accordance with one embodiment of the present invention.

Referring concurrently to FIGS. 3A and 3B, a first terminal of the inductor is connected to contact pad 230 which, in turn, is connected to the p+ region via contacts 232 and 234 and to the ground terminal Inductor 240 is adapted to increase the bandwidth of modulator 200. Inductor 240 may be spiral, rectangular, and the like. FIG. 4 shows a top layout view of one embodiment of inductor 240. In FIG. 4, inductor 240 is shown as having spiral form. It is understood that inductor 240 may have any other form such as rectangular, and the like. The second terminal of Inductor 240 is connected to pad 235. Dashed perimeter line 290 generally denotes the area within which optical ring 260 and sections of the main waveguide 210, such as section 280, are formed. For simplicity and aid in understanding, the details of optical ring modulator 200 are not shown in FIG. 4.

Figure 5:
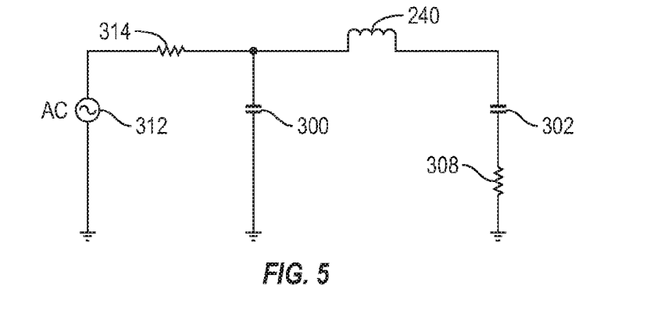
FIG. 5 is a schematic diagram that includes a model of the optical ring modulator shown in FIG. 3A, in accordance with another embodiment of the present invention.

FIG. 5 is a schematic diagram that includes a model of optical ring modulator 200 shown in FIG. 3A. Referring concurrently to FIGS. 3A, 3B, 4 and 5, capacitor 302 represents the capacitance of the junction between the p+ and n+ regions shown in FIG. 3B. Capacitor 300 represents the capacitances of pads 230 and 235. Resistor 308 represents the resistances of all active regions to the ground, including the resistances of contacts 232 and 234 (see FIG. 3A). Voltage source 312 represents the ac component of the voltage applied to the optical ring modulator to vary its refractive index. Resistor 314 represents the resistance of the resistor used to provide impedance matching between the voltage source and the optical ring modulator. In accordance with embodiments of the present invention, inductor 240 disposed between capacitors 300 and 302 causes an increase in the bandwidth of optical modulator 200.

Figure 6:
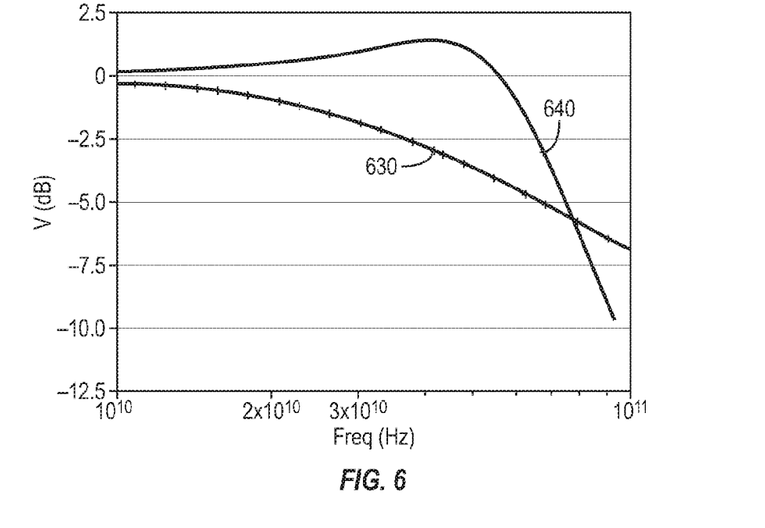
FIG. 6 shows the bandwidth of a conventional optical ring modulator, as well as that of an optical ring modulator in accordance with one embodiment of the present invention.

FIG. 6 shows the improvement achieved in bandwidth of an optical ring modulator having an inductor disposed between its contact pads and p-n junction as shown in FIG. 5. Plot 630 shows the frequency response of a conventional optical ring modulator that does not include an inductor. As is seen, the 3-dB frequency of such a conventional optical ring modulator is approximately 42 GHz. Plot 640 of FIG. 6 shows the frequency response of an optical ring modulator that includes an inductor between its contact pad and p-n junction. As is seen, the 3-dB frequency of the optical ring modulator, in accordance with the present invention, has a 3-dB frequency of 68.3 GHz. An inductance of 400 mH was used in generating plot 640. Consequently, an improvement of 24.3 GHz in bandwidth is achieved in accordance with this exemplary embodiment of the present invention.

Figure 7A:
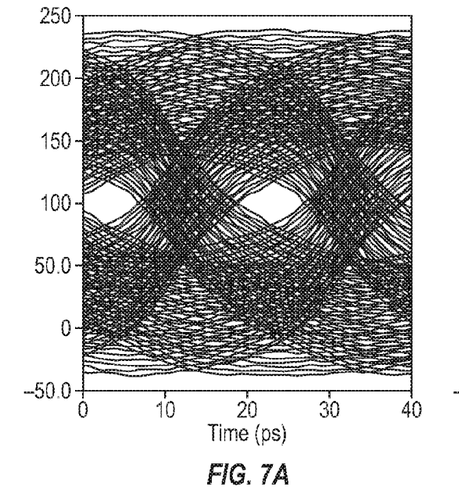
FIG. 7A is the eye diagram across the p-n junction of a conventional optical ring modulator.
Figure 7B:
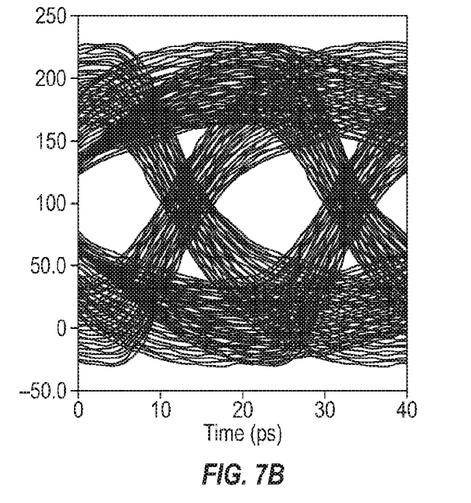
FIG. 7B is the eye diagram across the p-n junction of an optical ring modulator in accordance with embodiments of the present invention.

FIG. 7A is the eye diagram associated with the voltage across the p-n junction of a conventional optical ring modulator having the frequency response as shown in plot 630 of FIG. 6. FIG. 7B is the eye diagram of the p-n junction of an optical ring modulator that includes an inductor, in accordance with embodiments of the present invention, and having the frequency response as shown in plot 640 of FIG. 6. It is readily seen that the eye diagram associated with an optical ring modulator, in accordance with embodiments of the present invention, has a substantially wider opening compared to that of a conventional optical ring modulator.

Figure 8:
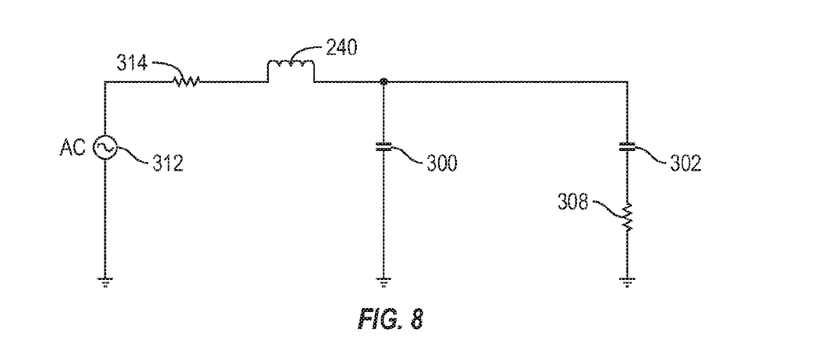
FIG. 8 is a schematic diagram of a model of a conventional optical ring modulator having an off-chip inductor.

An optical ring modulator, in accordance with the present invention, has a substantially increased bandwidth compared to conventional optical ring modulators that use off-chip inductors. FIG. 8 is a schematic diagram of a model of a conventional optical ring modulator having an off-chip inductor. Capacitor 302 represents the p-n junction capacitance of the ring. Capacitor 300 represents the capacitance of the contact pad. Resistor 308 represents the resistances of active regions. Inductor 314 represents the inductance of the off-chip inductor.

Figure 9A:
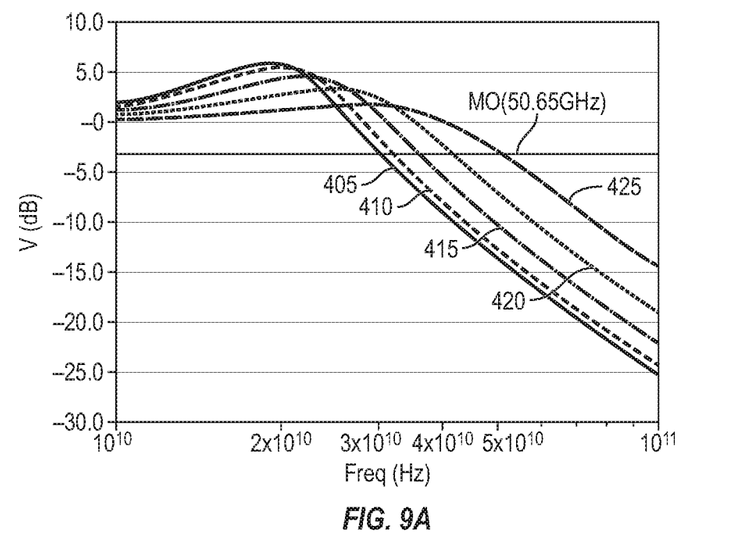
FIG. 9A shows computer simulation of the frequency response characteristics of a conventional optical ring modulator.

FIG. 9A shows computer simulation of the frequency response characteristics of a conventional optical ring modulator using five different off-chip inductors (see FIG. 8). Plots 405, 410, 415, 420 and 425 of FIG. 9A respectively show the frequency response characteristic of such a conventional optical ring modulator for off-chip inductors having respective values of 900 pH, 811.1 pH, 633.3 pH, 455.6 pH and 277.8 pH. The 3-dB frequency of, for example, plot 425 is shown as being approximately 50.65 GHz.

Figure 9B:
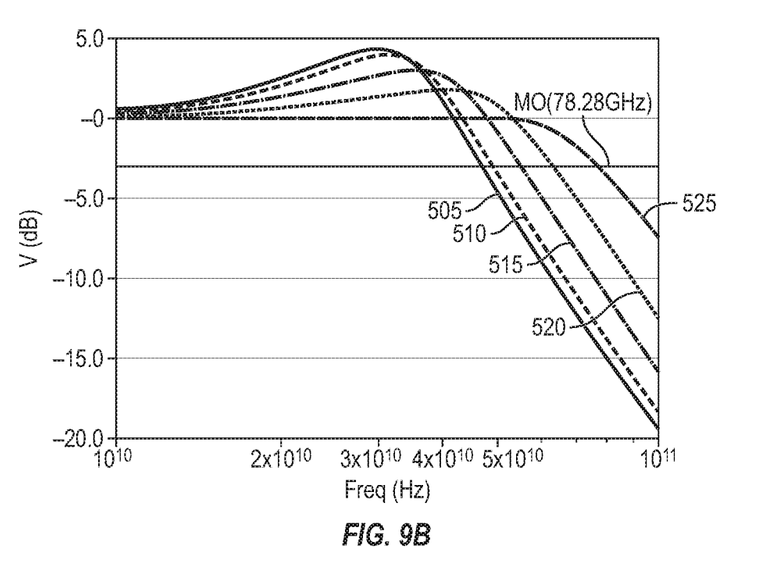
FIG. 9B shows computer simulation of the frequency response characteristics of an optical ring modulator, in accordance with one embodiment of the present invention.

FIG. 9B shows computer simulation of the frequency response characteristics of an optical ring modulator, in accordance with one embodiment of the present invention. Plots 505, 510, 515, 520 and 525 of FIG. 9B respectively show the frequency characteristic of the optical ring modulator having on-chip inductors with respective values of 900 pH, 811.1 pH, 633.3 pH, 455.6 pH and 277.8 pH. As is seen by comparing the plots shown in FIGS. 9A and 9B, for each inductor value, an optical ring modulator in accordance with the present invention has a substantially higher 3-dB frequency and thus a higher bandwidth than a conventional optical ring modulator. For example, an optical ring modulator, in accordance with the present invention, with an inductor of 277.8 pH has a 3-dB frequency of 78 GHz, which is 25 GHz higher than the 3-dB frequency of a conventional optical ring modulator having a similar off-chip inductor.

The above embodiments of the present invention are illustrative and not limitative. Embodiments of the present invention are not limited by any specific frequency or wavelength of the optical signal. Embodiments of the present invention are not limited by the type/shape of the inductor or optical modulator. Other additions, subtractions or modifications are obvious in view of the present disclosure and are intended to fall within the scope of the appended claims.

What is claimed is:

1. An integrated optical modulator comprising:
    a first waveguide adapted to receive an incoming optical signal;
    a second waveguide having a portion placed in proximity of the first waveguide so as to enable the incoming optical signal travelling in the first waveguide to couple to the second waveguide, said second waveguide comprising a p-n junction; and
    an inductor having a first terminal coupled to the p-n junction and a second terminal coupled to a contact pad.

2. The integrated optical modulator of claim 1 wherein said inductor has a spiral shape.

3. The integrated optical modulator of claim 1 wherein the second waveguide has a circular shape.

4. A method of modulating an optical signal, the method comprising:
    delivering the optical signal to a first waveguide comprising a p-n junction;
    causing the optical signal traveling through the first waveguide to be coupled to a second waveguide via a portion of the second waveguide placed in proximity of the first waveguide; and
    storing a part of an energy of the signal in an inductor disposed between the p-n junction and a contact pad.

5. The method of claim 4 wherein said inductor has a spiral shape.

6. The method of claim 4 wherein the portion of said second waveguide has a circular shape.

* * * * *

UNITED STATES PATENT AND TRADEMARK OFFICE
CERTIFICATE OF CORRECTION

| | | |
|---|---|---|
| PATENT NO. | : 9,651,803 B2 | |
| APPLICATION NO. | : 15/073240 | |
| DATED | : May 16, 2017 | |
| INVENTOR(S) | : Behrooz Abiri et al. | |

It is certified that error appears in the above-identified patent and that said Letters Patent is hereby corrected as shown below:

On the Title Page

At (71) Delete "California Institute of Technology" and insert --California Institute of Technology, Pasadena, CA (US)--

Signed and Sealed this
Fourth Day of July, 2017

Joseph Matal
*Performing the Functions and Duties of the*
*Under Secretary of Commerce for Intellectual Property and*
*Director of the United States Patent and Trademark Office*